United States Patent
Malamut et al.

(10) Patent No.: US 11,514,100 B2
(45) Date of Patent: Nov. 29, 2022

(54) AUTOMATIC DETECTION AND IDENTIFICATION OF GOLD IMAGE LIBRARY FILES AND DIRECTORIES

(71) Applicant: EMC IP Holding Company LLC, Hopkinton, MA (US)

(72) Inventors: Mark Malamut, Aliso Viejo, CA (US); Stephen Smaldone, Woodstock, CT (US); Arun Murti, Mission Viejo, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 30 days.

(21) Appl. No.: 17/174,840

(22) Filed: Feb. 12, 2021

(65) Prior Publication Data
US 2022/0197940 A1 Jun. 23, 2022

Related U.S. Application Data

(63) Continuation-in-part of application No. 17/124,957, filed on Dec. 17, 2020.

(51) Int. Cl.
*G06F 16/50* (2019.01)
*G06F 16/535* (2019.01)
*G06F 16/51* (2019.01)
*G06F 9/455* (2018.01)

(52) U.S. Cl.
CPC ........ *G06F 16/535* (2019.01); *G06F 9/45558* (2013.01); *G06F 16/51* (2019.01); *G06F 2009/4557* (2013.01); *G06F 2009/45579* (2013.01); *G06F 2009/45595* (2013.01)

(58) Field of Classification Search
CPC ............ G06F 11/1453; G06F 11/1464; G06F 11/1469; G06F 2201/84; G06F 16/24556; G06F 16/535; G06F 16/51; G06F 9/45558; G06F 2009/45595; G06F 2009/45579; G06F 2009/4557
See application file for complete search history.

(56) References Cited

U.S. PATENT DOCUMENTS

| | | | |
|---|---|---|---|
| 9,286,102 B1 * | 3/2016 | Harel | G06F 11/1402 |
| 10,691,659 B2 * | 6/2020 | Blumenau | G06F 16/219 |
| 11,113,086 B1 * | 9/2021 | Steinberg | G06F 9/45558 |
| 2013/0055256 A1 * | 2/2013 | Banga | G06F 9/45533 718/1 |

(Continued)

*Primary Examiner* — Merilyn P Nguyen
(74) *Attorney, Agent, or Firm* — Staniford Tomita LLP

(57) ABSTRACT

Reducing backup data by providing a data protection target for storing content data from clients running operating system and applications, and a common data protection target (CDPT) separate from the data protection target for storing Gold image data for the operating system and applications. Gold image data is stored by a user in a defined location or tagged with a defined tag. The stored or tagged Gold image data is identified by the backup software and copied to the CDPT. The identified Gold image data is cataloged. During backup, the CDPT is queried to determine if the Gold image exists, and if so, the DP target does not store the Gold image data in the DP target, but uses the reference to indicate the location of the Gold image data corresponding to the backed up content data. During a restore, the restore stream is built from the DP target and CDPT to combine user content data and Gold image data.

15 Claims, 10 Drawing Sheets

(56) References Cited

U.S. PATENT DOCUMENTS

| | | | |
|---|---|---|---|
| 2013/0325927 A1* | 12/2013 | Corbett | G06F 16/2453 |
| | | | 709/203 |
| 2013/0326260 A1* | 12/2013 | Wei | G06F 11/1469 |
| | | | 714/3 |
| 2015/0052523 A1* | 2/2015 | Raghu | G06F 9/45533 |
| | | | 718/1 |
| 2015/0067819 A1* | 3/2015 | Shribman | H04L 67/567 |
| | | | 709/218 |
| 2016/0188229 A1* | 6/2016 | Rabinovich | G06F 11/1464 |
| | | | 711/114 |
| 2016/0306624 A1* | 10/2016 | Vangelov | H04L 67/12 |
| 2016/0378535 A1* | 12/2016 | Oh | G06F 9/4451 |
| | | | 718/1 |
| 2018/0276000 A1* | 9/2018 | Roszak | G06F 9/4401 |
| 2020/0293498 A1* | 9/2020 | Vijayan | G06F 16/1744 |
| 2021/0286546 A1* | 9/2021 | Hodgson | G06F 3/0604 |
| 2021/0326046 A1* | 10/2021 | Handa | G06F 9/45558 |

* cited by examiner

200

| | 202 | 204 | 206 |
|---|---|---|---|
| | OPERATING SYSTEM | WINDOWS | Kernel Interfaces, Drivers Data Structures |
| | | LINUX | Kernel Interfaces Drivers Data Structures |
| | APPLICATIONS | DATABASE (e.g., SQL) | Data Structures APIs, Scripts/Macros |
| | | DATABASE (e.g., Oracle) | Data Structures APIs, Scripts/Macros |
| | | E-MAIL | Data Structures APIs, Scripts/Macros |
| | | WORD PROCESSOR | Data Structures APIs, Scripts/Macros |

FIG. 2

AUTOMATIC DETECTION AND IDENTIFICATION OF GOLD IMAGE LIBRARY FILES AND DIRECTORIES

CROSS-REFERENCE TO RELATED APPLICATIONS

The present application is a Continuation-In-Part application and claims priority to U.S. patent application Ser. No. 17/124,957 filed on Dec. 17, 2020, entitled "Gold Image Library Management System to Reduce Backup Storage And Bandwidth Utilization," and assigned to the assignee of the present application.

TECHNICAL FIELD

This invention relates generally to computer backup systems, and more specifically to automatically detecting Gold image files for backup in centralized data protection target storage.

BACKGROUND

Large-scale networks process and store large amounts of user data created by different applications and often deployed on different machines and operating systems (OS). Routine backing up of data is a critical task for any enterprise or organization, and well established products, such as DellEMC's Data Domain system are often used for providing deduplicated backup and restoration functions. Backing up large-scale network data involves backing up both the growing and changing (dynamic) user data as well as the relatively static OS and application data, structures, and definitions.

Customers often deploy a set of standard server configurations known as 'Gold images' multiple times. These Gold images may be pure OS images or they may be application/OS combinations such as a SQL Server on MS-Windows, Oracle on Linux, and so on. Gold image data is static (structural/definition) data that is deployed many times by users who wish to reuse the same code across many different deployed computers or machines. As these Gold images are placed into service (deployed) in user production systems, they help generate user content data, which is subject to data protection processes that store the Gold image data along with the user data.

Because of the sheer amount of data stored today and the increasing cost of computing resources, one of the key goals of data protection is to reduce the amount of data protection storage resources that are consumed. Present systems typically back up the Gold image (OS/application structural) data along with the content data simultaneously and at regular intervals. Because the Gold image data is static and deployed many times (e.g., used by many VMs) as compared to the more dynamic content data, repeated and regular storage of this Gold image data represents a large element of duplicated and wasted storage and processing resources.

Large-scale distributed systems may utilize many different assets (programs, machines, etc.) involving Gold image data. Many different instances of Gold image data may thus exist in such systems. What is needed, therefore, is a data protection system where the Gold image data can be easily identified for storage and processing separately from user content data.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain and Data Domain Restorer are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 2 illustrates a table showing a composition of a Gold image library storing OS and application data, under some embodiments.

DETAILED DESCRIPTION

Figure 1:
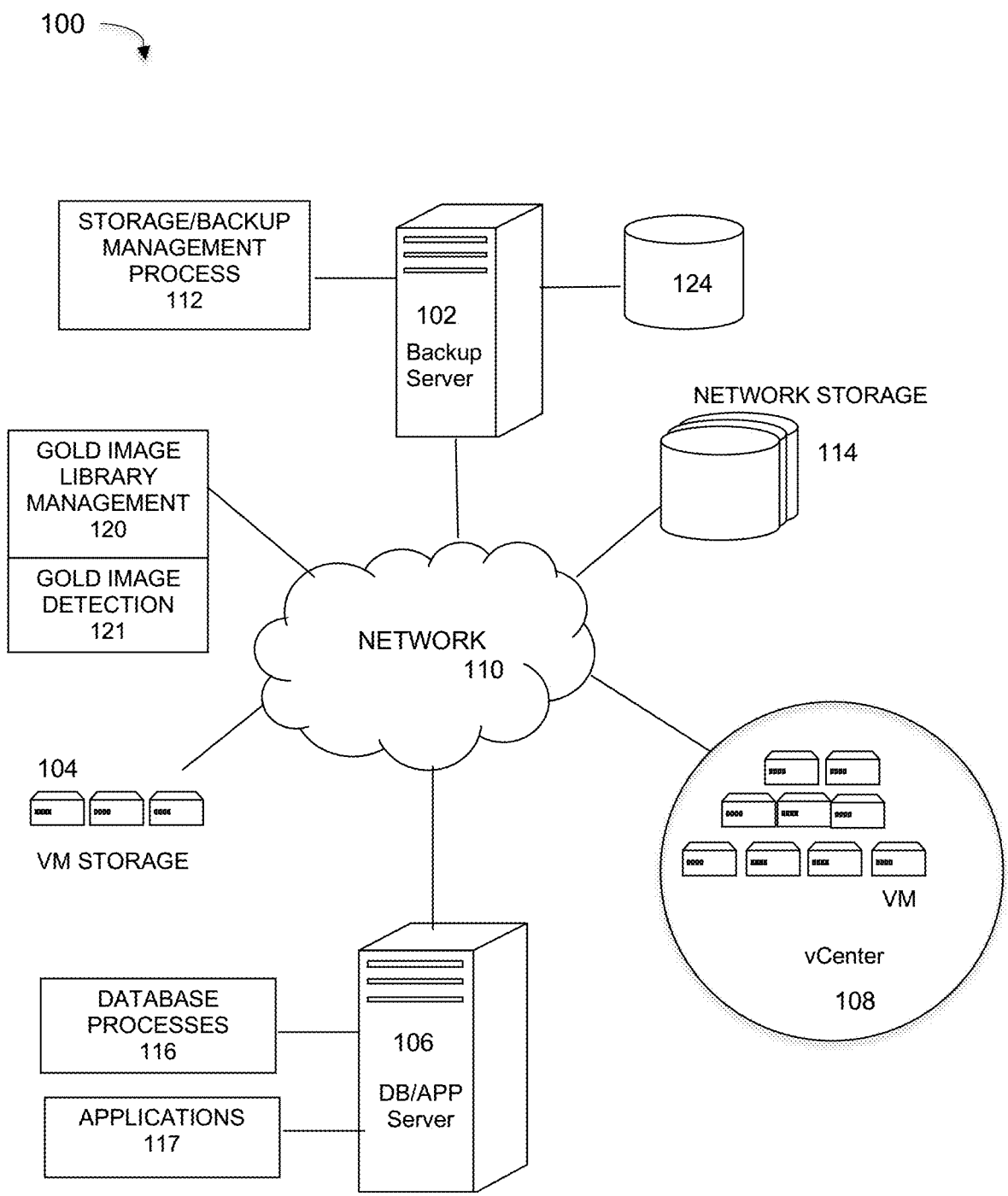
FIG. 1 is a diagram of a network implementing a Gold image library management system for data processing systems, under some embodiments.

A detailed description of one or more embodiments is provided below along with accompanying figures that illustrate the principles of the described embodiments. While aspects are described in conjunction with such embodiment(s), it should be understood that it is not limited to any one embodiment. On the contrary, the scope is limited only by the claims and the described embodiments encompass numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the certain methods and processes described herein. Applications may also be downloaded, in whole or in part, through the use of a software development kit or toolkit that enables the creation and implementation of the described embodiments. In this specification, these implementations, or any other form that embodiments may take, may be referred to as techniques. In general, the order of the steps of disclosed processes may be altered within the scope of the embodiments.

Some embodiments involve data processing in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are described for a Gold image library management system in which Gold images are automatically detected within a system and then centralized and backed up when needed, rather than constantly backed up with the user content data. By using this central repository, a vast number of deployed instances of these Gold images can be protected, thereby reducing the overall data protection footprint of the system.

FIG. 1 is a diagram of a network implementing a Gold image library management system for data processing systems, under some embodiments. In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 104, any number of virtual machines (VMs) or groups of VMs may be provided to serve as backup targets. FIG. 1 illustrates a virtualized data center (vCenter) 108 that includes any number of VMs for target storage. The VMs or other network storage devices serve as target storage devices for data backed up from one or more data sources, such as a database or application server 106, or the data center 108 itself, or any other data source, in the network environment. The data sourced by the data source may be any appropriate data, such as database 116 data that is part of a database management system or any appropriate application 117. Such data sources may also be referred to as data assets and represent sources of data that are backed up using process 112 and backup server 102.

The network server computers are coupled directly or indirectly to the network storage 114, target VMs 104, data center 108, and the data sources 106 and other resources through network 110, which is typically a public cloud network (but may also be a private cloud, LAN, WAN or other similar network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

The database 116 and other applications 117 may be executed by any appropriate server, such as server 106. Such servers typically run their own OS, such as MS Windows, Linux, and so on. The operating systems and applications comprise program code that defines the system and applications. As such, this code comprises data that is backed up and processed by backup server 102 during routine data protection backup and restore processes that involve all of the data of system 100.

The application and OS data are well defined by the manufacturers of these programs and comprise all the program data prior to or minus any user data generated by a user using the application or OS. This structural, non-content data is referred to as "Gold image" data because it is core data related to the structure, operation, and deployment of the applications and operating systems, rather than user-generated data. For example, Gold image data may comprise kernels, interfaces, file systems, drivers, data element definitions, macros, scripts, configuration information, and other data that comprises the software 'infrastructure' of the system, rather than the software content of the system. Such data generally does not change over time, as applications, and operating systems are revised or upgraded relatively infrequently, certainly when compared to user content additions or revisions. The application and OS data only needs to be updated when new versions are introduced, or when patches, bug fixes, drivers, virus definitions, and so on are added.

In current data processing and backup systems, Gold image data is treated as integrated with or closely coupled to the actual user content data, and is thus backed up and restored as part of an entire body of data that mixes the infrastructure data with the content data of the system. In many cases, this can greatly increase the total amount of data that is subject to backup and restore processes of the system. Thus, current data protection schemes use a one-to-one relationship in which data sources are backed up to a single data protection target. They do not define or use dual or multiple targets, that is, one for base (Gold image) data and a separate one for operational data (content data).

In an embodiment, Gold image data is maintained or stored in a Gold image library that defines a set of protected base image that can be shared among stored content data sets, but that is kept separate from those more dynamic data sets as they are processed routinely by the backup and restoration processes.

FIG. 2 illustrates a table 200 showing a composition of a Gold image library storing OS and application data, under some embodiments. As shown in table 200, the Gold image library comprises a repository storing base data for fundamental system programs, such operating systems and applications, as well as any other infrastructural programs. Column 202 lists the one or more operating systems, and the one or more different applications. Any number of different operating systems and applications may be used, and the example of table of FIG. 2 two different operating systems (Windows and Linux) and four example applications: SQL and Oracle databases with e-mail and word processing applications, as listed in column 204. The data elements in column 206 of table 200 represent the various programs, software definitions, and data for elements of the operating systems and applications that are written or defined by the manufacturer and sold or provided to the user under normal software release or distribution practices. FIG. 2 is intended only to provide an example Gold image library, and embodiments are not so limited. Any structure or data composition may be used to define and store the Gold image data comprising the data system.

The base or system data stored in the Gold image library, such as in table 200 comprises a base set of protected data that is stored separately from the user content data that is generated by the deployment and use of the operating systems and applications 204. In an embodiment, system 100 includes a Gold image library management component or process 120 that centralizes and stores the Gold image data when it is needed, rather than on the constant basis imposed by the backup management process 112. By using this central repository, a nearly infinite number of deployed instances of these Gold Images can be protected and thereby reduces the overall data protection footprint.

For the embodiment of FIG. 1, the Gold image library manager 120 may be implemented as a component that runs within a data protection infrastructure, and can be run as an independent application or embedded into an instance of data protection software 112 or a data protection appliance. Any of those implementations may be on-premise within a user's data center or running as a hosted service within the cloud 110.

As shown in FIG. 1, in a typical user environment there are a collection of a clients that consist of VMs and/or physical machines. Typically, larger users will create a set of Gold images that they use repeatedly as the baseline for these clients so as to standardize their OS and application deployments. For example, a Gold image library may include Microsoft (MS) Windows 2012 plus SQL Server 2008, MS Windows 2016 plus SQL Server 2017, SLES 12 plus Oracle 8i, or any other combinations that users choose to use as their set of standard deployments. By reusing these standard Gold images, customers can speed up the deployment of clients and certify these deployments for security or other reasons. Users may deploy these Gold images many tens or hundreds of times. The more often a standard deployment can be used, the more control users can exercise over their environment.

Figure 3A:
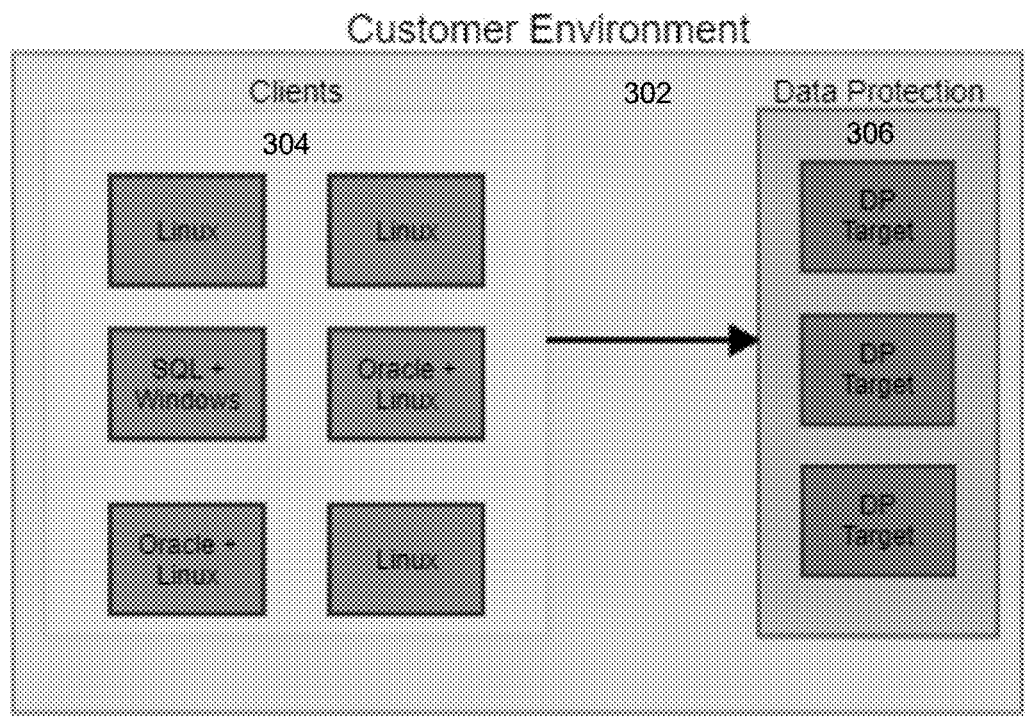
FIG. 3A illustrates an example user environment with VM clients running various OS and database application combinations for protection on a single data protection (DP) target set.

A data protection system for protecting deployed systems can be built in a variety of ways. FIG. 3A illustrates an example user environment with VM clients running various OS and database application combinations for protection on data protection (DP) clients, and that implements a Gold library management process, under some embodiments. As shown in FIG. 3A, user (or 'customer') environment 302 includes a number of clients 304 each comprising a machine running an OS, application, or combination OS plus application. The clients 304 represent data sources that are used and ultimately produce data for backup to data protection targets or storage devices 306. This represents what may be referred to as a 'production' environment.

Figure 3B:
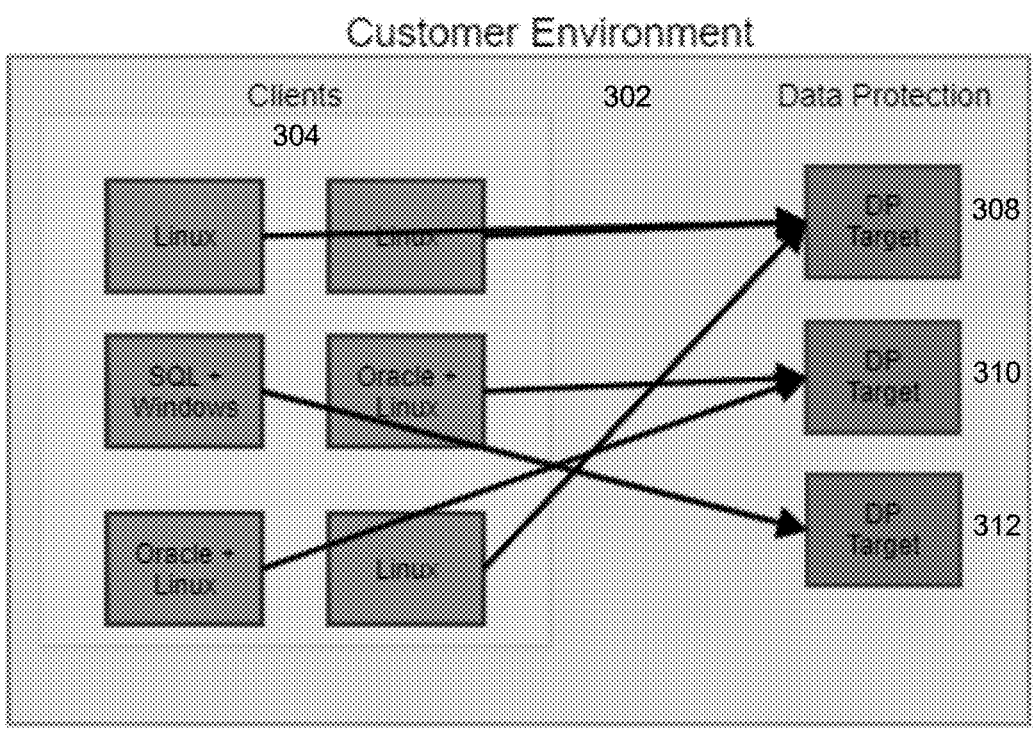
FIG. 3B illustrates an example user environment with VM clients running various OS and database application combinations for protection on individual data protection (DP) targets.

For the example of FIG. 3A, three of the clients are Linux only clients, while others are a combination, such as Windows plus SQL or Linux plus Oracle, and so on. The data from these clients is stored in one or more data protection targets that may be provided as a single logical data protection target 306 as shown in FIG. 3A. Alternatively, the data protection targets may be provided as individual data protection targets, as shown in FIG. 3B. Thus, as shown in the example of FIG. 3B, certain OS and application clients are backed up to DP target 308, others are backed up to DP target 310, and the remainder are backed up to DP target 312. In one embodiment, a DP target may be implemented as a Data Domain Restorer (DDR) appliance or other similar backup storage device.

The base OS and/or application data for each client 304 without any user content data comprises a Gold image for that client, and is typically stored along with the user content data in an appropriate DP target. As stated earlier, however, this Gold image data is static but is yet stored repeatedly based on the DP schedule for the user content data. Due to this reuse of Gold images by users, there typically is a substantial amount of duplicate data that ends up in a data protection environment. In an attempt to minimize this duplication of data, user presently may assign all data sources that use the same Gold image or images to a single data protection target. Doing such requires a significant amount of customer management, and can become difficult to manage and maintain over time as data sources expand and need to be migrated to new data protection targets.

To eliminate or at least alleviate the amount of duplicated data stored across multiple DP targets when Gold image is protected, the Gold image library management system 120 uses a common dedicated DP target for the protection of Gold images. Each regular DP target can then deduplicate its own data against this common DP target to save only new Gold image data rather than repeatedly re-storing existing Gold image data with the user content data on DP targets. This process effectively adds another deduplication function on any user data deduplication process provided by the DP system, and helps eliminate all or almost all sources of duplicate data storage.

Figure 4:
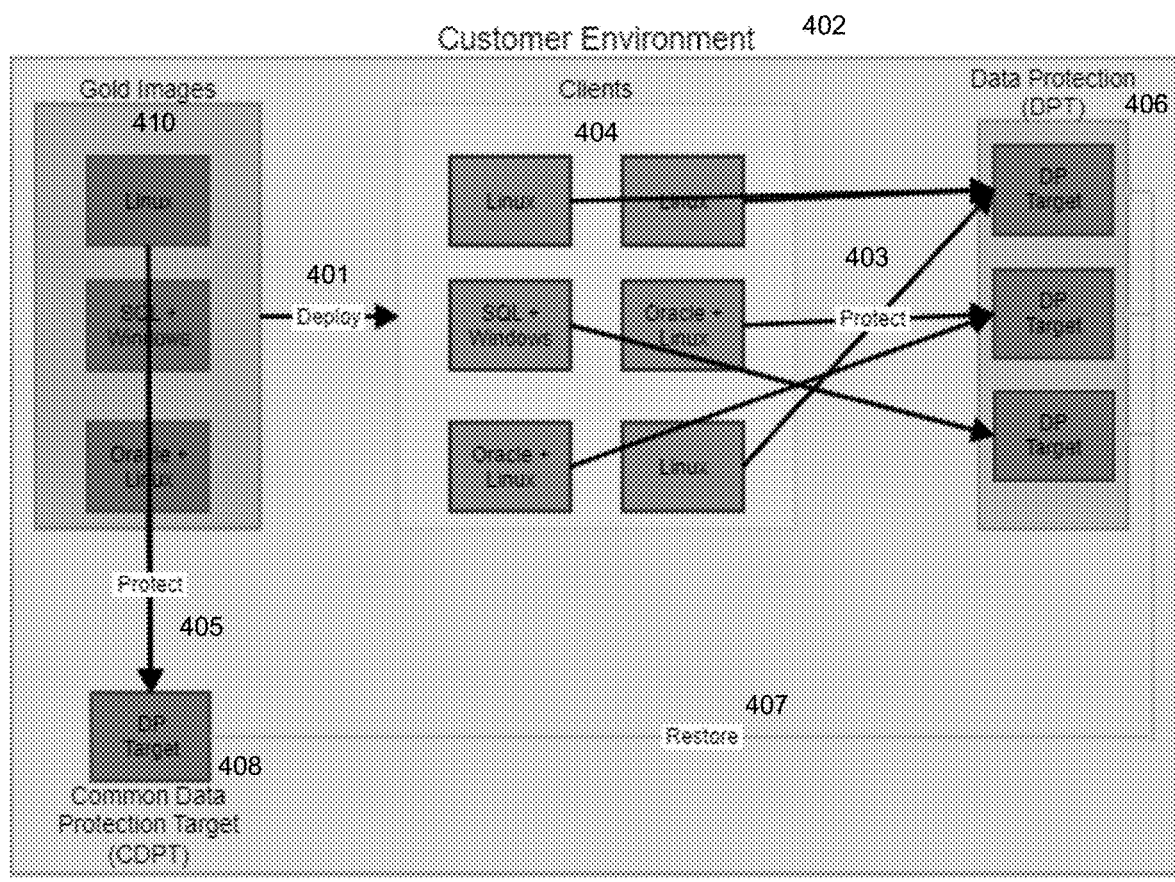
FIG. 4 illustrates a common data protection target (CDPT) storing Gold image data for network clients, under some embodiments.

FIG. 4 illustrates a common data protection target (CDPT) storing Gold image data for network clients, under some embodiments. As shown in FIG. 4, user environment 402 includes different OS and application clients 404 with their user content data stored in DP targets 406 under an appropriate protection scheme 403, as described above. The Gold images 410 comprise the base code for each of the OSs and applications that are implemented on the clients through a deployment operation. When an OS and application are deployed 401, they are loaded onto appropriate physical or virtual machines and configured or instantiated for use by the user to generate content data that is then periodically stored through protection process 403 onto data protection targets 406. For this embodiment, the Gold images are not stored with the client data in DP protection storage 406. Instead, the user environment 402 includes a Common Data Protect Target (CDPT) system 408 that stores only the Gold images 410 through its own protection process 405.

During a normal backup process, the regular DP protection storage 406 will store the user content data (usually deduplicated), and will query the CDPT to determine if the Gold image data for the OS and applications for the clients resides in the CDPT. If so, the DP target 406 system will leverage that previously and centrally stored 408 data instead of storing it in the general purpose data protection target 406. This will facilitate a savings in the overall size of the data protection environment. In system 402, the DP target system 406 is provided as storage devices for storing user content data generated by one or more data sources deployed as clients running one or more operating system and application programs. The CDPT 408 is provided as storage devices accessible to but separate from the DPT storage 406 for storing Gold image (structural) data for the one or more operating system and application programs.

Figure 6:
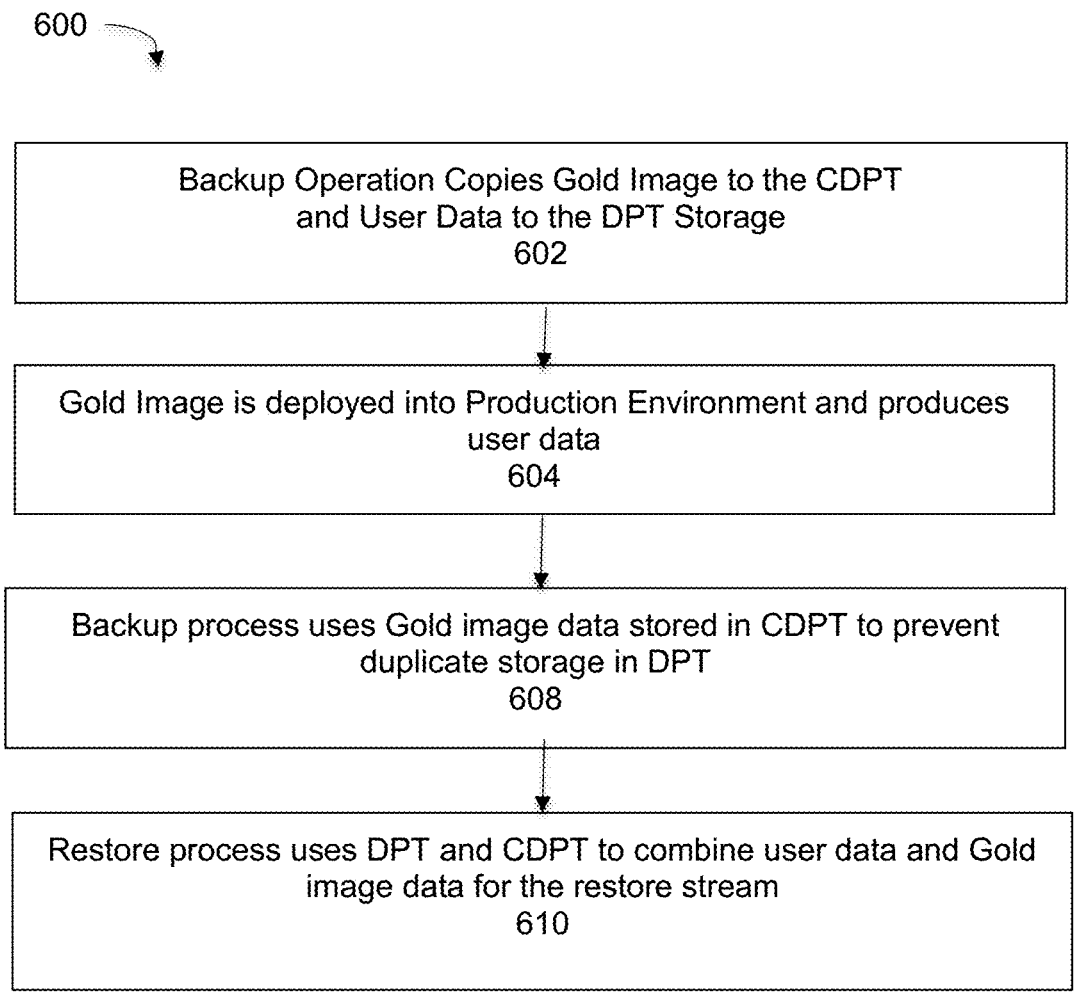
FIG. 6 is a flowchart that illustrates an overall method of using a CPDT to store Gold image data for data protection, under some embodiments.

FIG. 6 is a flowchart that illustrates an overall method 600 of using a CPDT to store Gold image data for data protection, under some embodiments. As shown in FIG. 6, Gold images are first backed up to the CDPT, 602. This is done in a backup operation 521 that also backs up content data from the client VM to the data protection storage (DPT). The Gold image is then deployed and placed into the production environment, typically comprising one or more VMs (e.g., 108), and starts producing user data, 604. During normal data protection backup operation, the user data from the VMs is copied to DP targets in the backup operation of 602. In previous systems, this backup would copy all files including user content and Gold image data from the client VMs to the DP targets. If the same Gold image data is deployed on many VMs, the DP targets would store a great deal of redundant data. For the embodiment of FIG. 6, the backup process instead uses the single Gold image data stored in the centralized CDPT to prevent this duplicate storage of the Gold image data in the DP targets, 608. When the data protection process involves a data restored from the DP targets back to the original or different VMs, the restore process simply involves combining the user data from the DP targets with the Gold image data from the CDPT to form the restore stream, 610.

Method 600 of FIG. 6 uses certain chunk data structures stored in the DP targets 406 and CDPT 408 to reference stored Gold image data that is used for the content data stored in the DP targets. The CDPT stored Gold image data is referenced in the DP targets to prevent redundant storage of this data in the DP targets, since it is already stored in the DCPT. During a backup operation, the DP target queries the CDPT to determine if the Gold image data for the client already exists in the CDPT. If it does already exist, the DP target will not store the Gold image data in the DP target, but will instead use the reference to indicate the location of the Gold image data corresponding to the backed up user content data. Backups of the production VM will look to see if the data exists on the DP target. If it does not exist there, then the CDPT is checked for the data. If it exists on the CDPT a remote chunk is created. If it does not, then a regular local chunk is created.

In a standard data protection storage system, the stored data is saved in a chunk data structure comprising the data itself, a hash of the data, and a size value. In general, files for the Gold image data are different from the files for the user content data. Thus, the data stored in a data structure for the Gold image data is separate and distinguishable from the data stored in the data structures for the content data.

Figure 5A:
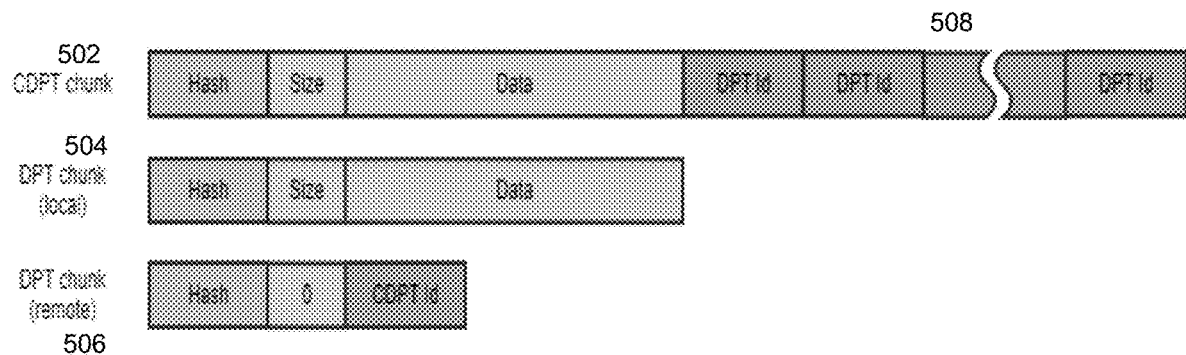
FIG. 5A illustrates a chunk data structure for storing content and Gold image data, under some embodiments.

FIG. 5A illustrates a chunk data structure for storing content and Gold image data, under some embodiments. As shown in FIG. 5A, DPT chunk 504 for each client 404 storing data in DP targets 406 comprises the Hash_Size_Data for each client instance in a data structure, as shown. This is referred to as a 'local' chunk with respect to the DPT storage 406 and stores the data for files comprising the content data for respective VM clients. The Size field in local DPT chunk 504 is always a non-zero value as it represents the size of the data that is stored locally on the DP target. Thus, local chunks stored in the DPT will have a non-zero size field and chunk data.

In order to support the use of the CDPT 408, the chunk data structure is augmented as shown for data structure 502. The CDPT chunk 502 comprises the hash, size, and data, and also a list of zero or more DPT IDs 508. Each entry in this DPT ID list will refer to a specific DP target that references a particular chunk. As there is no reference counting, this DPT ID list will contain a DPT ID either zero or one time exactly. A DPT ID 508 can be a standard device ID, such as a universally unique identifier (UUID) or similar.

The remote DPT chunk 506 is stored in the DP target 406 and refers to a remote chunk on a CDPT device. In this chunk data structure, the Size field is zero, as it references the remote CDPT through the CDPT ID for the CDPT device where the chunk data resides. The Gold image data stored in the CDPT target 408 is thus referenced within the DP target by remote DPT chunk data structure 506 that comprises a hash, a zero Size field, and the CDPT ID. FIG. 5A illustrates different variants of the chunk data structure based on its location, i.e., stored in the DPT or CDPT. Thus, on the DP target, the local DPT chunk 504 Size field is always non-zero and indicates the size of the data stored locally on the DP target, while the remote DPT chunk 506 Size field is always zero as there is no data stored locally for the Gold image, since it is store remotely on the CDPT as the CDPT chunk 502.

Figure 5B:
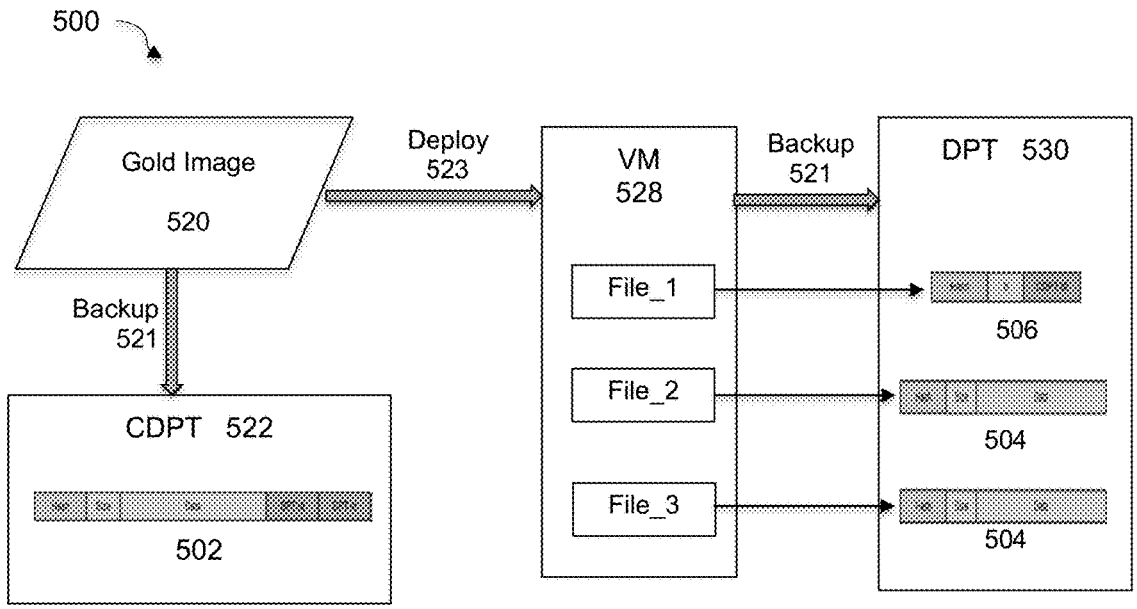
FIG. 5B illustrates storage of chunk data structures in the CDPT and DPT, under some embodiments.

FIG. 5B illustrates storage of chunk data structures in the CDPT and DPT, under some embodiments. As shown in system 500, Gold image data 520 is stored in CDPT 522 during backup operation 521. This backup operation also copies content data from VM client 528 to DPT storage 530. The data structure storing this data uses the CDPT chunk data structure 504 of FIG. 5A. This Gold image is then deployed 523 to client VM 528. During use of the OS and applications of the Gold image, certain user data is generated, thus deployment and use generates several files, denoted File_1, File_2, File_3, and so on. In the example of FIG. 5B, File_1 comprises the Gold image data for Gold image 520, while the other files (File_2 and File_3) are content data files. During a backup operation 521, these files are copied to DP target 530 for storage. The content data for files File_2 and File_3 are stored in the DPT using the DPT chunk data element (local) 504 of FIG. 5A. The Gold image data of File_1 is already stored in CDPT 522 in chunk data structure 502, thus it does not need to be stored again in DPT 530. Instead, the Gold image data is referenced within DPT 530 though DPT chunk (remote) 506, indicating that the Gold image data for VM 528 is available remotely in CDPT 522. In this case, the Gold image data of File_1 is only stored as a hash value and a CDPT ID referencing CDPT 522. The size field is set to '0' indicating that no data is stored for File_1. This prevents redundant storage of the data in CDPT chunk data structure 502. With respect to the CDPT chunk data structure 502 stored in CDPT 522, the DPT ID fields 508 contain the identifiers for DPT 530 and any other DP targets (not shown) that may reference this Gold image data.

Figure 7A:
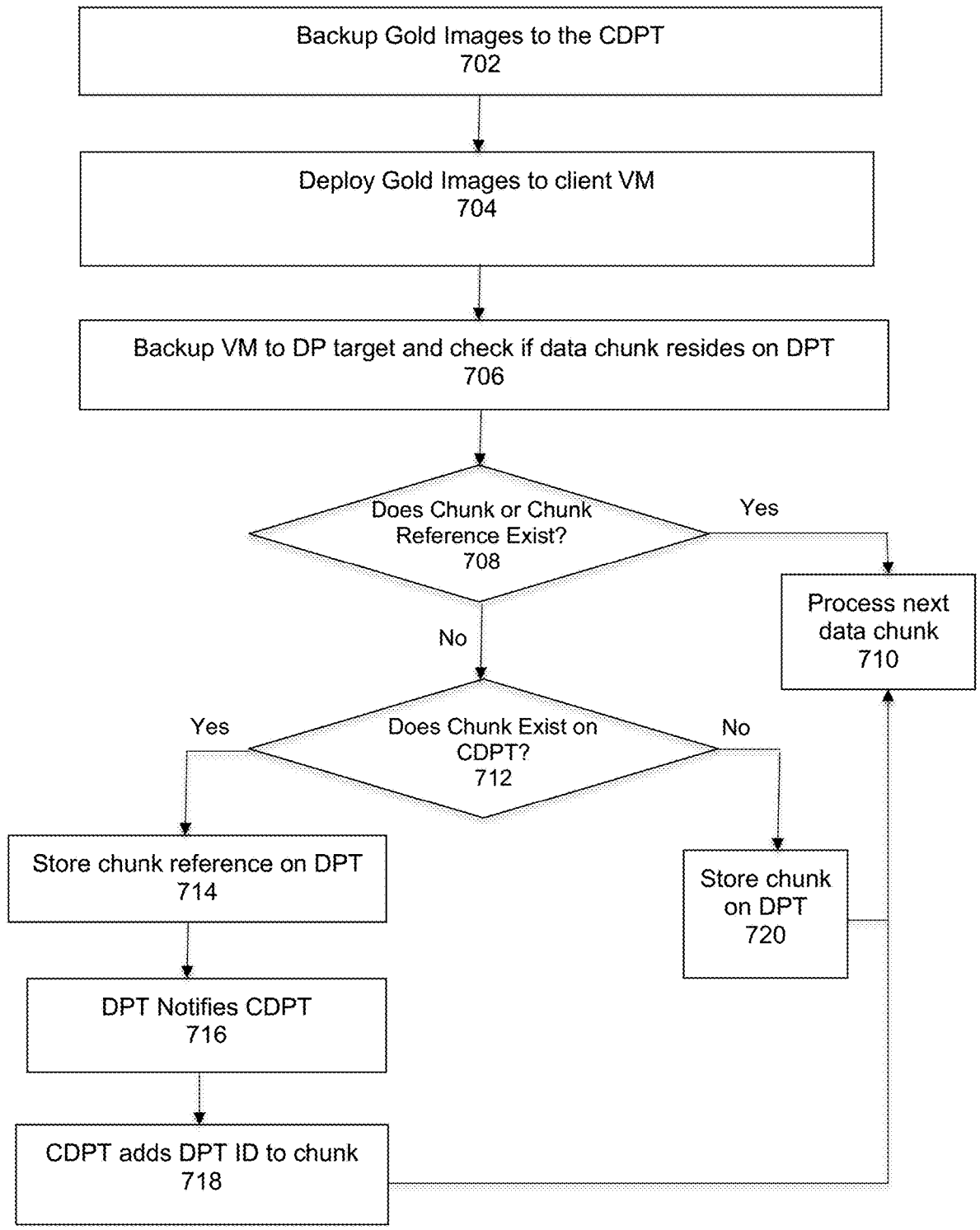
FIG. 7A is a flowchart that illustrates a backup process using a common data protection target for Gold images, under some embodiments.

FIG. 7A is a flowchart that illustrates a backup process using a common data protection target for Gold images, under some embodiments. As shown in FIG. 7A, Gold images are backed up to the CDPT 408 as part of the data protection operation, 702. In step 704, the Gold image is deployed by the user to the client. The data protection operation also backs up the client VM to the DP target 406. Upon backup, the process checks to see if a data chunk or data chunk reference for this backed up data already resides on the DPT, 706. If, in step 708, it is determined that the chunk data or the chunk reference exists on the DPT, the next data chunk is processed in loop step 710. If, in step 708, it is determined that the chunk or chunk reference does not exist on the DPT, the process next determines whether or not the chunk exists on the on the CDPT 408, as shown in decision block 712. If the chunk does not exist on the CDPT, the data chunk is stored on the DPT, step 720, and the next data chunk is processed, 710.

If, in block 712 it is determined that the chunk does exists on the CDPT, the process stores the chunk reference on the DP target containing only the chunk's hash, the identifier of the CDPT where the data resides and a size of zero, 714 (signifying an empty data field in this case). The DP target will then notify the CDPT that the chunk is being used and provides the ID of the DP target, 716. The CDPT will then add the ID of the DP target to the chunk on the CDPT, 718, and the next data chunk is then processed, 710. Each data chunk on the CDPT is augmented with a data structure that has a list of identifiers for each regular DP target (DPT) that refers to any CDPT chunk one or more times, as shown in FIG. 5A.

During backup, the DP target 508 may either examine the CDPT system 408 for the data in real-time or (as one optimization), land the data locally on the DP target for performance considerations. If a DPT does initially land the data locally, it will retain a list of the hashes that have not yet been examined for existence on a CDPT. This will enable an off-line process to examine a bulk of hashes collectively at a later point in time in order to check if they exist remotely. For hashes found remotely, as described above, the DPT ID is added to the DPT ID list 508 from the chunk on the CDPT (if it is not already in this list). After that is completed, the local DPT chunk 504 has its data portion removed, the CDPT ID is added, and the 'size' field is set to zero.

With respect to restore processing, as data sources age, they typically contain much more private data than the common CDPT data. That is the user content data grows at a much greater rate than the relatively static Gold image data. Therefore the extra access time required to retrieve any remote data related to the baseline Gold image is generally not a major detriment to restore speed.

Figure 7B:
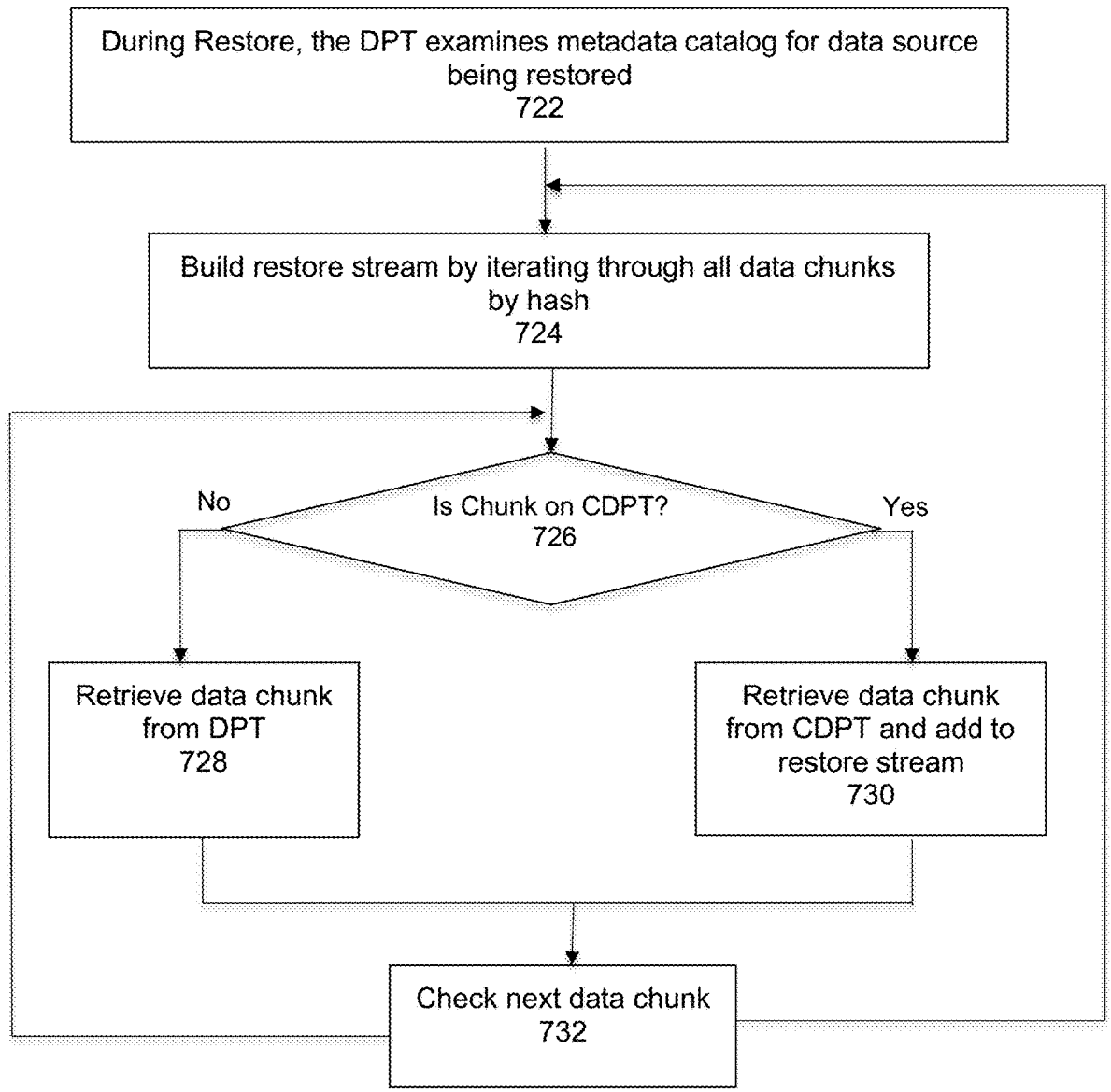
FIG. 7B is a flowchart illustrating a method of performing a data restore operation using a CDPT system, under some embodiments.

FIG. 7B is a flowchart illustrating a method of performing a data restore operation using a CDPT system, under some embodiments. During a restore operation, the DP target 406 examines the metadata catalog for the data source (client) being restored 404, step 722. It will iterate though all of the chunks by hash in order to build the restore stream, 724. If a chunk is not on the CDPT, as determined in step 726, the process will retrieve the data chunk from the DPT 728 check the next data 732. For chunks that are on the CDPT 408, the DP target 406 will retrieve those chunks from the CDPT and use them to add to the restore stream, 730. The next data chunk will then be checked 732.

The Gold image library and CDPT system minimally impacts or even enhances certain garbage collection functions of system 100. In general, garbage collection (GC) is a regularly scheduled job in deduplication backup systems to reclaim disk space by removing unnecessary data chunks that are no longer being referenced by files that were recently modified or deleted. On the DP target system 406, garbage collection is performed as under normal GC procedures to identify and remove unnecessary data chunks. A DPT chunk exists while it is being referenced (regardless if the chunk is local or remote). When there are no longer any references to a chunk detected, the chunk is removed locally. For the embodiment of FIG. 4, this removal is also communicated to the remote CDPT system 408. The CDPT system is given the hash and DPT ID and will remove the DPT ID from that chunk. On the CDPT system, only chunks that have no DPT ID records can be examined for possible garbage collection. For chunks that meet this test, the CDPT system may remove the chunk when there are also no local references. This enables all systems to perform garbage collection nearly independently of each other.

In an embodiment, system 402 of FIG. 4 also implements a CDPT registry. In order for a DP target system 406 to know which CDPT devices 408 it can access, each DP target system will hold a local registry of the valid CDPT systems that it may leverage for remote data. Any practical number of CDPT systems may be used, but in normal system implementations, a single CDPT system will usually be sufficient for most environments.

The CDPT process can be optimized in at least one of several different ways. For example, as the CDPT 408 only contains Gold images that only house static OS and/or installed applications (as opposed to dynamically generated data after a client is entered into service), there is no value to checking the CDPT for data existence after the first backup. There are multiple methods that can assist in this process. One is to build a cache, such as a file cache and/or data cache, when Gold images are backed up to the CDPT 408. When a Gold image is deployed, the caches are also propagated to the deployed instance. The backup software can check these caches and avoid any network traffic for this known static data which resides in the cache. This can apply to every backup of a client. The system only checks data chunks for existence in the CDPT during the first backup as the static data only needs to be checked once. Dynamically building a data cache during backup allows a client to pull a cache (partial or full) from the CDPT.

As another optimization, the restoration process (e.g., FIG. 7B) can retrieve data from two separate locations simultaneously. The Gold image static data can be retrieved from the CDPT 408 while the dynamic data will come from the DP target 406.

Certain DP target post processing steps can be optimized. During a protection operation, clients send their data to the DP target 406. In order to minimize network traffic and complete the backup as quickly as possible, all data lands on the DP target in its fully expanded form (stored as local to a DP target). A list of the hashes that need to be checked are maintained. Periodically, this hash list is queried against the connected CDPT server(s). If the data is found, the local instance is converted to a remote instance and the CDPT registers the DPT as a consumer of the relevant hashes. Similar to the above client optimization, a cache of hashes can be maintained locally which is either build dynamically on the fly or copied periodically from the CDPT.

Another optimization is to use a secondary (common) data protection target that works in conjunction with the regular DP targets 406 in order to minimize duplication of data. This process augment data chunk structures to indicate where data resides (local or remote with the remote's ID). Clients may indicate when a first backup is performed as that is when the highest likelihood of data on a common data protection target will be encountered for the first time. This will avoid unneeded communication with the CDPT and improve performance.

Automatic Gold Image Detection

In an embodiment, system 100 includes a process or component 121 that implements a Gold image detection function. This function helps the backup system easily and automatically identify Gold Images among the many different data sets that may be processed. In general, Gold images are differentiated from production systems and other data sets or savesets. As described above, by using the CDPT 408 for Gold images, a significant reduction in the resources required to protect assets can be achieved. The function of detection component 121 may be provided as part of the Gold image library management 120 process or it may be provided as a stand-alone or cloud-based process.

In an embodiment, the automatic detection of Gold images is performed in one of two ways. First is the use of a well-known or specially defined location to store the Gold image data, and the second is the use of a tag associated with Gold image data set. When the backup software detects a new gold image using either of these methods, the image will be stored on the CDPT. This alleviates the need for administrators to manually backup new gold images to the CDPT.

For the first method, a defined (well-known) location can be defined by the user in several different ways. For example, an administrator may have a central network location (e.g., NFS share) where they choose to store their Gold images. In addition, various hypervisors and container orchestration systems have a central location where common images are stored. This is a storage location defined by an administrator where administrators and/or users store standard images that are typically reused. For example, VMware vSphere has a concept of a Content Library. A specific sub-location (e.g., folder named "Gold Images") may be created as a standard location within these systems for storing Gold images. These well-known locations will be made known to the backup software and any images within these well-known locations are considered Gold images. In an embodiment, the storage of a Gold image file within a directory is determined by analyzing the path of the file within the system, where the path includes an identifier of the well-known location.

In the second method, a tag is associated with a file. This tagging may be done by the backup software or may be user defined metadata supported by another mechanism such as the extended attributes of a file system. Using either of these mechanisms, a special or defined tag (alphanumeric string) such as "GoldImage" will be set to the user Gold images. For this embodiment, the defined tag is appended to or incorporated in the name, attributes, or path, etc. of the Gold image file.

Figure 8:
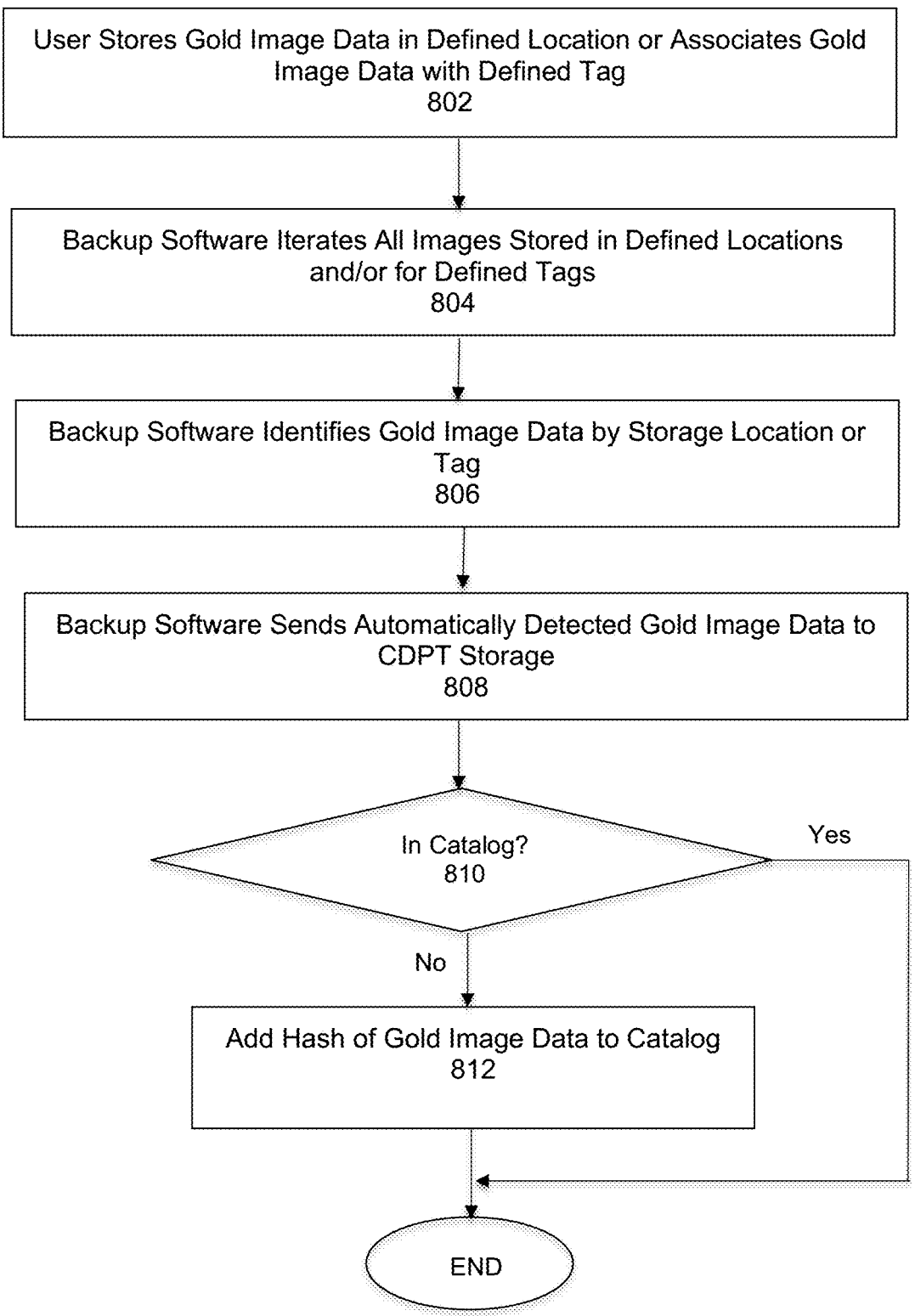
FIG. 8 is a flowchart that illustrates a method of automatically detecting Gold image data, under some embodiments.

FIG. 8 is a flowchart that illustrates a method of automatically detecting Gold image data, under some embodiments. The process begins 802 with the user store Gold image data in a defined or well-known location and/or associating the image data with a defined Gold image tag. As part of the standard backup process, the backup software will find all the Gold images. It will do so by iterating all of the images within the well-known locations and looking for images tagged with Gold image tags, 804. This iterative detection process can occur on a periodic (typically daily) basis, or as specifically initiated by the user. All files identified 806 to be Gold images by being found in a defined Gold image location or tagged with a Gold image tag will be sent to the CDPT storage 808. The backup software will also maintain a catalog of Gold images that it has previously encountered by hashing the contents of each image. In step 810 it is determined if the identified Gold image data is in the catalog or not. If the hash of the Gold image data is not in the catalog, the file will be considered new, sent to the CDPT and added to this catalog, 812. If it is in the catalog, the process ends after storage in the CDPT.

System Implementation

Embodiments of the processes and techniques described above can be implemented on any appropriate backup system operating environment or file system, or network server system. Such embodiments may include other or alternative data structures or definitions as needed or appropriate.

The processes described herein may be implemented as computer programs executed in a computer or networked processing device and may be written in any appropriate language using any appropriate software routines. For purposes of illustration, certain programming examples are provided herein, but are not intended to limit any possible embodiments of their respective processes.

Figure 9:
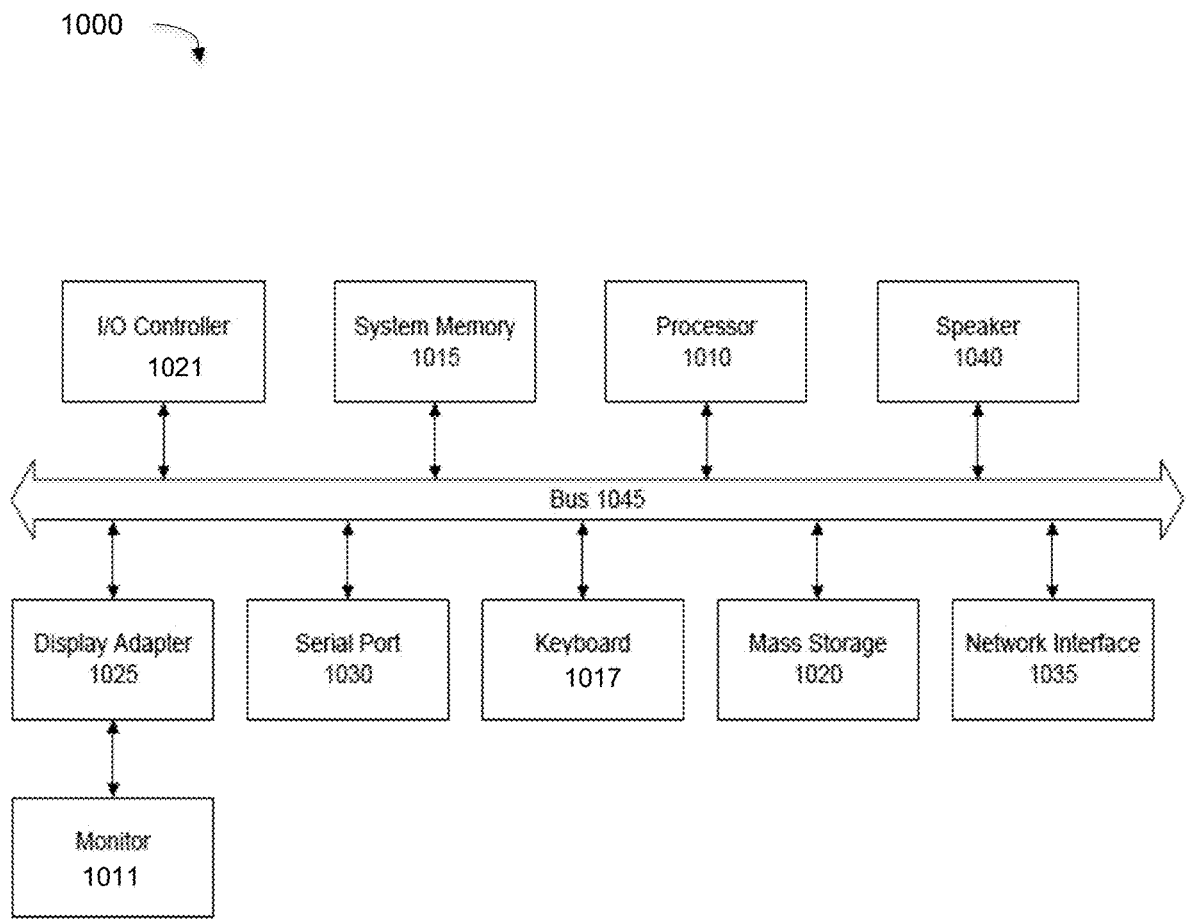
FIG. 9 is a system block diagram of a computer system used to execute one or more software components of a Gold image library management system, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 9 shows a system block diagram of a computer system used to execute one or more software components of the present system described herein. The computer system 1000 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is just one example of a computer system suitable for use with the present system. Other configurations of subsystems suitable for use with the described embodiments will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the described embodiments. Additionally, steps may be subdivided or combined. As disclosed herein, software written in accordance certain embodiments may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method comprising:
    automatically identifying Gold image data stored in a defined location or tagged with a defined tag based on the location or tag, wherein the Gold image data comprises structural data for the one or more operating system and application programs, wherein the structural data comprises operating system and application data defined by a manufacturer and different from the user content data;
    providing a data protection (DP) target for storing user content data generated by one or more data sources deployed as clients running one or more operating system and application programs;
    providing a common data protection target (CDPT) accessible to but separate from the data protection target;
    copying, during a backup operation of a client, the user content data is copied from the client to the DP target and copying the identified Gold image data to the CDPT; and
    determining if the identified Gold image data exists in a catalog, and if not, saving a hash of the Gold image data in the catalog, wherein the defined location comprises a central network location accessible by a user and selected by the user to store the Gold image data, and wherein the tag comprises an alphanumeric string appended to the Gold image data to identify the Gold image data.

2. The method of claim 1 wherein the identifying step is performed regularly according to a defined periodic schedule.

3. The method of claim 1 further comprising:
referencing the structural data in the DP target to prevent redundant storage of the structural data in the DP target; and
querying the CDPT to determine if the structural data for the client already exists in the CDPT, and if so, causing the DP target to not store the structural data in the DP target and instead use the reference to indicate the CDPT as the location of the structural data corresponding to the backed up user content data, and if not, using the structural data stored in the DP target.

4. The method of claim 3 further comprising, during a restore operation, building a restore stream from the DP target and the CDPT to combine the user content data and the corresponding structural data for the restored data set.

5. The method of claim 4 further comprising defining a local DP target chunk for the DP target and comprising the user content data, a hash value, and a size value, and defining a CDPT target chunk for the CDPT target and comprising the structural data, a hash value, a size value, and the DP target ID field.

6. The method of claim 5 further comprising: defining a remote DP target chunk for the CDPT relative to the DP target and comprising the hash value, a binary index value, and an identifier for the CDPT (CDPT ID), and wherein each entry DP target ID field refers to a specific DP target device that references the CDPT target chunk.

7. The method of claim 6 wherein the DP target ID field will contain a DP target ID either zero or one time exactly, and will refer to a local chunk or a remote chunk on the CDPT device, wherein a local chunk has a non-zero size field and chunk data.

8. The method of claim 7 wherein, if the size field is zero, there is no data portion and the CDPT ID references the remote CDPT where the chunk data resides.

9. A method of automatically detecting and storing Gold image data, comprising:
iteratively processing all path and file name attributes of all files in a network;
first identifying files stored by a user in defined Gold image locations based on the path;
second identifying files tagged with a Gold image tag based on the file name attributes;
storing the first and second identified files in a dedicated, centralized common data protection target (CDPT), wherein the Gold image data is stored as data chunks and comprises structural data for operating systems and applications separately from user content data to reduce redundant storage of data in backup systems; and
maintaining a catalog for storage of hash values of identified Gold image files, wherein the Gold image locations comprise one or more central network locations accessible by a user and selected by the user to store the Gold image data, and wherein the tag comprises an alphanumeric string appended to the Gold image data to identify the Gold image data.

10. The method of claim 9 wherein the first and second identifying steps are performed regularly according to a defined periodic schedule.

11. The method of claim 9 further comprising:
storing content data generated by use of the operating systems and applications in one or more data protection (DP) targets;
augmenting each data chunk in the CDPT with a data structure that has a list of identifiers for each DP target that refers to any CDPT chunk one or more times; and
checking, upon a backup operation, by each DP target whether a backed up data chunk is present in the CDPT, and if not, storing it in the DP target, otherwise if the data is present in the CDPT, causing the chunk on the DP target to contain only the chunk's hash, an identifier of the CDPT where the data is present, and a size of zero.

12. The method of claim 11 further comprising:
notifying the CDPT by the DP target that the chunk is being used;
providing the ID of the DP target for addition by the CDPT to the chunk on the CDPT;
adding, to the DP target ID list, the CDPT ID from the chunk on the CDPT;
removing from the local DPT chunk the data portion; and
adding the CDPT ID and setting the size field to zero.

13. The method of claim 12 further comprising performing a restore operation by:
examining a metadata catalog for a client being restored;
iterating though all data chunks by hash to build a restore stream; and
retrieving chunks present in the CDPT for addition to the restore stream.

14. A system comprising:
a data protection (DP) target for storing user content data generated by one or more data sources deployed as clients running one or more operating system and application programs;
a common data protection target (CDPT) accessible to and separate from the data protection target for storing Gold image data comprising structural data for the one or more operating system and application programs, wherein the structural data comprises operating system and application data defined by a manufacturer and different from the user content data;
an identifier component automatically identifying Gold image data stored in a defined location or tagged with a defined tag based on the location or tag, wherein the Gold image data comprises structural data for the one or more operating system and application programs, wherein the structural data comprises operating system and application data defined by a manufacturer and different from the user content data; and
a first server component copying, during a backup operation of a client, the user content data is copied from the client to the DP target and copying the identified Gold image data to the centralized CDPT, and determining if the identified Gold image data exists in a catalog, and if not, saving a hash of the Gold image data in the catalog, wherein the defined location comprises a central network location accessible by a user and selected by the user to store the Gold image data, and wherein the tag comprises an alphanumeric string appended to the Gold image data to identify the Gold image data.

15. The system of claim 14 wherein the identifier component performs identification regularly according to a defined periodic schedule.

* * * * *